UNITED STATES PATENT OFFICE 2,645,600

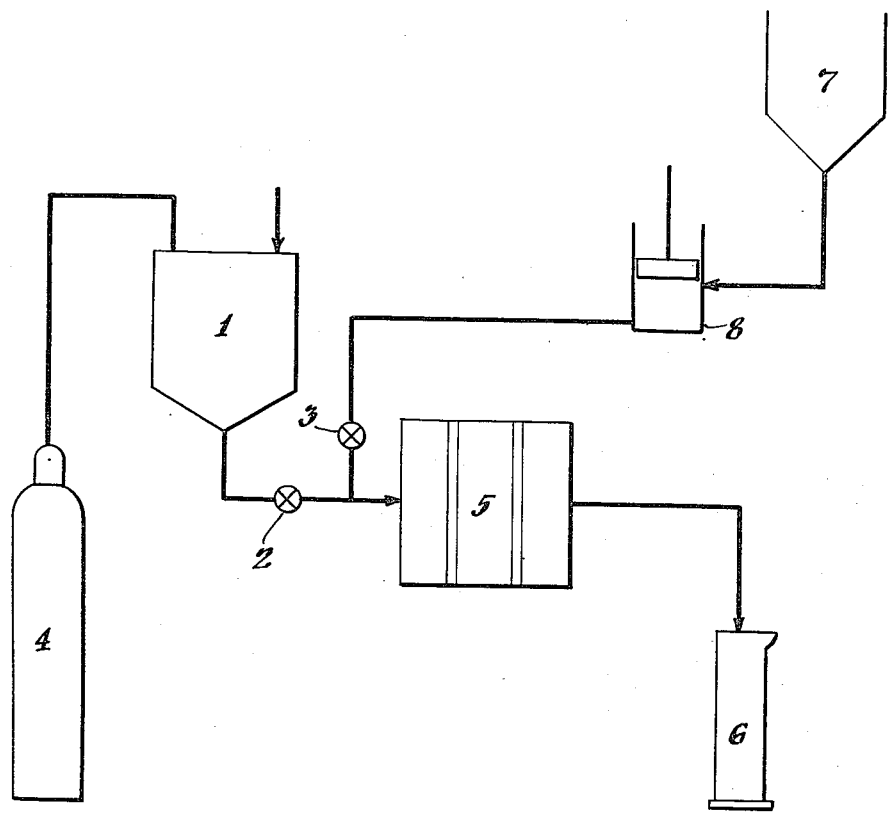

PROCESS FOR DEWAXING OILS CONTAINING WAX

Harold C. Myers and Arnold O. Pukkila, Woodbury, and James I. Barnes, Mickleton, N. J., assignors to Socony-Vacuum Oil Company, Incorporated, a corporation of New York Application October 4, 1949, Serial No. 119,502

17 Claims. (Cl. 196—19)

This invention relates to the separation of wax from wax-oil mixtures, and is more particularly concerned with a process for dewaxing hydrocarbon fractions containing crystalline wax or microcrystalline wax. More specifically, the present invention provides an improved process for effecting wax filter pressing.

It is well known to those familiar with the art, that the nomenclature of petroleum waxes is controversial. The reasons for the differences in the crystallization of wax from different fractions of petroleum have been the subject of much difference of opinion among the students of petroleum wax chemistry. Accordingly, for the purposes of the present invention, the term crystalline or paraffin wax is used herein to designate the petroleum wax obtained from relatively light petroleum fractions, including gas oil and neutrals, while the term petroleum ceresin or microcrystalline wax is used herein to designate the petroleum wax obtained from residues of petroleum.

Typical of the distillate stocks from which crystalline wax is obtained are the heavy gas oil-lubricating oil cuts known in the art as wax distillates, boiling between about 300° F. and about 600° F., at 10 mm. pressure and having a Saybolt Universal viscosity at 100° F. of about 50 seconds to about 80 seconds. Crystalline wax, after purification, is hard, dry and white and the component crystals will vary from long needles to hexagonal plates. The melting point of crystalline wax varies with its oil content, small amounts of oil lowering the melting point and tensile strength appreciably and rendering the crystalline wax oily.

As is also well known to those familiar with the art, filter pressing or wax filter pressing is a cheap and a widely applied method of removing wax from those hydrocarbon fractions which contain wax. Briefly, in wax filter pressing, the wax-containing stock is chilled to a temperature approximately equal to the desired final pour point of the dewaxed oil to precipitate the wax and is then pumped through a filter press. The oil passes through the filter septa emerging from the filter press as what is termed in the art pressed oil. The wax is retained as a cake on the septa of the filter press. The wax cake is removed from the septa of the filter press, conveyed to a wax dump tank wherein it is melted and then usually pumped to storage. The wax obtained from the filter presses, referred to in the art as slack wax, is soft, crumbly and contains a relatively large amount of oil, frequently, from about thirty per cent up to over sixty per cent. Accordingly, the slack wax is subjected to further treatment in order to remove the oil from the wax. The usual method utilized is sweating. In this operation, the slack wax is heated slowly, until the oil and the lower-melting point waxes drain from the fibrous mass of higher-melting point waxes, and are thus removed. It is well established that a relatively low oil-content slack wax is essential for efficient sweating and for obtaining high yields of the more valuable higher-melting point waxes.

In the case of the more viscous lubricating oil distillates, it is necessary to resort to dilution with naphtha or other suitable hydrocarbon solvent, as is well known in the art, in order to reduce the viscosity of the charge stock to the pressable range, viz., about 70 seconds to about 80 seconds Saybolt Universal viscosity at 100° F. Dilution is also required in the processing of high wax-content oils, and when it is desired to produce low oil-content waxes.

Although essentially a simple process, wax filter pressing has many disadvantages. The most noteworthy of these are (1) low pressed-oil throughput rates, resulting both in heavy capital expenditures in order to obtain sufficient press capacity and in high labor costs for the frequent opening and dumping of the presses, and (2) high wax cake oil-contents necessitating troublesome deoiling operations, such as sweating, with attendant oil and wax losses. Accordingly, the desirability of a process whereby these disadvantages inherent in wax filter pressing operations are eliminated or substantially minimized is manifest.

An improved wax filter pressing process has now been found whereby the aforementioned disadvantages are overcome to a great extent. It has now been discovered that the affinity between the wax and the oil can be materially reduced through the conjoint use of surface active agents and of non-freezing aqueous solutions, thereby increasing appreciably the pressed oil rates and diminishing the oil-contents of wax cakes.

Therefore, it is a broad object of the present invention to provide an improved process for separating oil from wax-oil mixtures. Another object is to provide an improved wax filter pressing operation. A more specific object is to reduce the oil-contents of wax cakes obtained from wax filter pressing operations. A further object is to afford a process for treating a wax cake to still further reduce its oil-content. A very important object is to increase the pressed oil rates in wax filter pressing operations. Other objects and advantages of the present invention will become apparent to those skilled in the art from the following description taken in conjunction with the drawing showing a diagrammatic illustration of a plant for practicing the process of the present invention.

In accordance with this process, the affinity between the wax and the oil is materially reduced through the partial wetting of the wax crystal surfaces by non-freezing aqueous solutions. For the primary purpose of providing a more complete understanding of the scope of the present invention, but without any intent of limiting the same, the mechanism whereby wax crystal surfaces are wetted by non-freezing aqueous solutions, in the presence of oil or of oil-solvent mixtures, stripped to its essentials, may be postulated to be as follows: In general, a surface active agent is considered to be a compound, usually an organic compound, one extremity of a molecule of which is polar in nature, in this instance hydrophilic or oil-repellent, while the other is non-polar in nature, in the present case, hydrophobic or oil-avid. Since wax is essentially oily in character, it follows that, with respect to the non-polar end of a molecule of a surface active agent, there will be competition between wax and oil or between wax and an oil-solvent mixture. Conceivably, a surface active agent can be chosen or prepared, a molecule of which possesses a non-polar end which is more avid for wax than for oil or oil-solvent mixture. Therefore, in a system consisting of a wax phase dispersed in an oil or oil-solvent phase, the molecules of such a surface active agent will adsorb at the wax-oil or wax-oil-solvent mixture interfaces. This, in effect, means that the wax surfaces are coated, at least in part, with a water-avid or oil-repellent film. Hence, when water or an aqueous solution is added to the system as a third phase, water or the aqueous solution becomes attached to the wax surfaces. The resulting system then will consist of wax particles at least partially covered with water or aqueous solution dispersed in a continuous oil or oil-solvent phase. Hence, whereas in a system consisting of a wax phase dispersed in an oil or oil-solvent phase, the latter phase completely envelops and wets the entire surface of each wax particle, in the system modified through the conjoint addition thereto of water or aqueous solution and of a surface active agent, since at least portions of the wax surfaces are covered with water or aqueous solution, the oil or oil-solvent phase cannot and will not envelop and wet the entire surface of each wax particle. It follows that the affinity between the wax and the oil or oil-solvent or the wetting of the wax by the oil or oil-solvent is materially reduced.

In normal wax filter pressing operations, the dewaxed oil or oil-solvent is caused to move through the interstices of the wax cake, by an imposed difference in pressure. Since the interstices are in effect long, winding, capillary channels, considerable resistance to flow in encountered by the dewaxed oil or oil-solvent. It follows that, other variables remaining constant, the rate of flow of the dewaxed oil or oil-solvent varies inversely as the viscosity of the dewaxed oil or oil-solvent and varies directly as the slip coefficient between dewaxed oil or oil-solvent and wax. As set forth hereinbefore, in the wax filter pressing operations of the prior art, the dewaxed oil or oil-solvent is directly in contact with the solid wax and the great affinity of oil or oil-solvent for wax results in zero slip at the interfaces therebetween. In accordance with the present invention, the dewaxed oil or oil-solvent will be in contact with water and since a large amount of slip is known to take plate at oil-water interfaces, a reduction in resistance to flow inevitably follows. The obvious result is that the passage of oil through a wax cake, other variables remaining constant, is greatly facilitated and that the oil-content of the wax cake is greatly reduced.

At the end of the wax filter pressing operation, dewaxed oil or oil-solvent will remain in the interstices of the wax cake. Since, as stated hereinbefore, a non-freezing aqueous solution of a surface active agent displaces oil or oil-solvent mixture at a wax surface, it follows that the interstitial dewaxed oil or oil solvent can be removed from the wax cake and recovered by flowing a non-freezing aqueous solution or a non-freezing aqueous solution of a surface active agent through the wax cake.

Accordingly, and broadly stated, the present invention provides:

(1) A process for effecting wax filter pressing, which comprises adding a non-freezing aqueous solution to a wax-containing oil, treating the mixture thus obtained in the presence of a surface active agent to disperse the aqueous solution in the oil, chilling the mixture to dewaxing temperature, and subjecting the chilled mixture to a wax filter pressing operation; and (2) A process for reducing the oil-content of an oil-containing wax cake, which comprises washing the wax cake with a non-freezing aqueous solution in the presence of a surface active agent.

From the foregoing, it will become apparent to those skilled in the art that the process contemplated herein may be carried out in accordance with several procedures, all of which, nevertheless, are encompassed by the broad statement of invention set forth hereinbefore. By way of illustration, a preferred specific embodiment of the present invention may be practiced as follows: A mixture is initially prepared by adding a wax-containing oil stock, such as, for example, a wax distillate having a Saybolt Universal viscosity of 72 seconds, at 100° F., to about 5 per cent by weight of a solution consisting of 75 per cent by volume of water, 25 per cent by volume of ethylene glycol (to provide a non-freezing aqueous solution), and about 0.25 per cent by weight of "Tergitol 7" ($C_{17}H_{34}SO_4Na$) as supplied by Carbide and Carbon Chemical, as the surface active agent. The mixture is agitated at a temperature of 120–150° F., and then chilled, with agitation, to the dewaxing temperature, normally about 20° F.

Referring now more particularly to the drawing, the chilled mixture is fed to a charge tank 1 and then, with valve 2 open and valve 3 closed, pressure from a source 4 is applied so that the chilled mixture enters a filter press 5. Pressed oil is collected in a receiver 6. The wax cake in the filter press can be washed free of a substantial portion of its oil-content by closing the valve 2 and opening the valve 3. For this purpose, wash solution consisting of an aqueous solution of ethylene glycol (95 per cent by weight) and "Tergitol 7" (5 per cent by weight) in a tank 7 is pumped by a pump 8 through the wax cake in the filter press. As a result, an additional amount of dewaxed oil is removed from the wax cake, thereby decreasing its oil-content while increasing the yield of the pressed oil. In those filter presses not fitted for backwashing, such as center-feed, chamber-type filter presses, the wash is introduced through the feed line. Backwashing, where possible, provides a better washing action. The wax cake and pressed oil are heated, the non-freezing aqueous solutions of wetting agent are thus separated and returned to the process. Wax and dewaxed oil may be further washed, if desired, and finished by a drying operation.

In general, any wax-containing oil or any oil-containing wax is amenable to the process of the present invention. The wax-containing oil ordinarily is a distillate stock, although other wax-bearing oils, such as brown coal tar oils, shale oils, and synthetically produced oils, any of which may have been previously subjected to a deasphalting treatment or other treatment for the purpose of improving their physical and/or their chemical nature may be mentioned by way of non-limiting examples of materials suitable as charge stocks for the process contemplated herein. There appears to be nothing critical in the amount of wax present in the wax-containing oils or in the amounts of oil present in the oil-containing waxes to be treated. Thus, the wax-content of the charge stocks may vary between about 0.1 per cent and about 99.9 per cent by weight. On the other hand, the amount of wax present in either of the mixtures is largely determinative of the fluidity of the charge to the process.

Accordingly, in practicing the invention, it is sometimes necessary to increase the fluidity of the charge to the process by the addition of an oil-miscible diluent or solvent which will lower the viscosity of the oil. The solvents which may be used herein are those well known in the prior art. A suitable solvent, in general, should possess the following properties. In should be substantially completely miscible with the stock to be treated, it should be substantially insoluble in and immiscible with water, it should possess, preferably, a low viscosity coefficient, it should not manifest any substantial tendency to emulsify under the conditions of the process, it should be a poor solvent for solid wax at the dewaxing temperature, it must not disturb the adsorption of the molecules of the wetting agent at the solid wax surfaces, it must not affect, to any appreciable extent, the tendency of the wetting agent to adsorb at the solid wax surfaces, and, finally it should not displace water from the water- or aqueous solution-wetted wax surfaces. Hydrocarbons such as propane, butane, pentane, propene, butenes, pentenes, naphtha, gasoline, benzene, and kerosene, and methylethyl ketone, trichloroethylene, ethylene dichloride, methyl chloride, carbon tetrachloride, acetone, and mixtures thereof such as methylethyl ketone-benzene mixtures, acetonitrile-benzene mixtures, ethyl carbonate-propane mixtures, may be mentioned by way of non-limiting examples of diluents or solvents suitable for the purposes of the present invention.

There appears to be nothing critical in the amounts of diluent or solvent used. As stated hereinbefore, the primary purpose of the diluent is to increase the fluidity of the charge to the process. Accordingly, the amounts of diluent used may vary between wide limits. Ordinarily, amounts to produce between about a 0.1:1 and about 20:1, preferably between about 2:1 and about 4:1 (volume of solvent to volume of charge stock) dilution are employed. In practice, the solvent is added usually prior to or during the chilling step.

Generally speaking, the surface active agents utilizable herein are those which are known as such in the art. As stated hereinbefore, the surface active agents are characterized by molecules having a hydrophobic group (the non-polar group) and a hydrophilic group (the polar group). The surface activity of the molecule in an aqueous-non aqueous system (in the broad sense), such as exists in the process of the present invention, is due to the adsorption of the molecule at an interface. In general, it may be stated that the preferred surface active agents applicable herein are those in which the hydrophobic portion of the molecule is hydrocarbon-like in nature and the hydrophilic portion is a radical selected from the group consisting of —OH, —SO$_3$H, —COOH, —CO, —NH$_2$, —NO$_2$, —N.N—, —N:N.N—, —CSNH, —CONH$_x$, —COO, PO$_4\equiv$, —PO$_3$H$_2$, =PO$_2$H, —COC—, SO$_4$M and —SO$_3$M, wherein M is the hydrogen equivalent of a metal. These criteria, therefore, afford the basis for a classification of the various types of surface active agents suitable for the purposes contemplated herein. For convenience, the types may be tabulated as follows:

TABLE I

*Types of surface active agents*

TYPE A

| Group Name | Formula of an Example |
|---|---|
| 1. Fatty acid salt | R-COONa. |
| 2. Dimetal salt of a sulfated fatty acid. | RC$_n$H$_{2n-2}$(SO$_4$Na)COONa. |
| 3. Glyceryl ester of a fatty acid. | RCOOCH$_2$CHOHCH$_2$OH. |
| 4. Metal sulfonate of a fatty acid ester. | RCOOCH$_2$CH$_2$SO$_3$Na. |
| 5. Metal sulfonate of a fatty acid amide. | RCONHCH$_2$CH$_2$SO$_3$Na. |
| 6. Fatty acid amide ethyl dialkyl amine. | RCONHCH$_2$CH$_2$NR'R''. |

TYPE B

| | |
|---|---|
| 1. Metal alkyl sulfate | RSO$_4$Na. |
| 2. Metal secondary alkyl sulfate | R$_2$CHSO$_4$Na. |
| 3. Metal bisulfate of dialkyl dicarboxylate. | R'—C—O—CH$_2$<br>‖<br>O<br>\|<br>R—C—O—C—SO$_4$Na<br>‖<br>O |

TYPE C

| | |
|---|---|
| 1. Metal alkyl sulfonate | RSO$_3$Na. |
| 2. Metal aryl sulfonate | Aryl SO$_3$Na. |
| 3. Metal alkaryl sulfonate | R'Aryl SO$_3$Na. |

TYPE D

| | |
|---|---|
| Quaternary ammonium halide | $\begin{bmatrix} R' \quad R'' \\ \diagdown \diagup \\ N \\ \diagup \diagdown \\ R \quad R''' \end{bmatrix} X$ |

TYPE E

| | |
|---|---|
| Natural substances | |

Wherein
R, R', R'' and R''' are alkyl or alkenyl radicals,
X is a halogen, and
n is a whole number.

A number of surface active agents representative of types classified in Table I were tested in accordance with the procedure set forth in the specific embodiment described hereinbefore, and were found to be effective in the operation of the process. For convenience, these materials are tabulated in Table II.

TABLE II

*Effective surface active agents*

| Chemical Name or Formula | Trade Name |
|---|---|
| 1. (structure: 2,6-diisopropylnaphthalene sulfate with $OSO_3Na$) | Nekal A. |
| 2. (structure: diisobutylnaphthalene with $OSO_3Na$ and $CH_2CH(CH_3)_2$ groups) | Nekal B. |
| 3. $C_{14}H_{29}SO_4Na$ | Tergitol 4. |
| 4. $C_{17}H_{34}SO_4Na$ | Tergitol 7. |
| 5. Sodium wax phenol sulfonate | |
| 6. Sorbitan monostearate [1] | Span 60. |
| 7. $C_{12}H_{25}C_6H_3(OH)SO_3Na$ | |
| 8. $C_9H_{19}C_6H_3(OH)SO_3Na$ | |
| 9. $(C_{18}H_{37})_3C_6H(OH)SO_3Na$ | |
| 10. $(C_{18}H_{37})_2P(=O)(OH)$ | |
| 11. $[CH_3CH(CH_2)_4]_2P(=O)(OH)$ with $C_2H_5$ | |
| 12. $(C_{18}H_{37})_2P(=O)(ONa)$ | |
| 13. $[CH_3CH(CH_2)_4]_2P(=O)(ONa)$ with $C_2H_5$ | |

[1] Sorbitan is derived from the dehydration of sorbitol to cause ring closure, through an ether linkage, to produce a six-member or a five-member ring.

The surface active agents enumerated in Table II are illustrative of specific surface active agents operable in the process of the present invention. Materials known as alkali metal wax aromatic sulfonates or alkali metal wax oxyaromatic sulfonates and alkali metal salts of sulfated fatty acids are typical of two of the preferred classes of surface active agents to be used herein and in order to furnish the criteria to be applied in the selection of a surface active agent which will give optimum results with a given charge stock, further discussion of surface active agents utilizable herein will be had in conjunction with alkali metal salts of wax aromatic sulfonic acids.

Materials known as wax phenol sodium sulfonate, for example, may be prepared, as is well known in the art, in accordance with the following procedure (U. S. Patent to Reiff et al., No. 2,252,666): A paraffin wax melting at about 120° F. and predominantly comprised of compounds having at least 20 carbon atoms per molecule is chlorinated by heating to about 200° F. and bubbling chlorine therethrough until the chlorwax obtained contains from about 10 per cent to about 21 per cent by weight of chlorine. The chlorwax is then condensed with phenol, at a temperature of about 350° F. and in the presence of about 4 per cent to about 10 per cent by weight of an aluminum chloride Friedel-Crafts catalyst, to produce wax-substituted phenol. This product is treated with chlorsulfonic acid in amounts, on a weight basis, of about 100–175 per cent of theoretical, in a conventional sulfonation operation, at a temperature of about 125–200° F. and the product thus obtained is neutralized with sodium hydroxide in amounts, on a weight basis, of about 120–150 per cent of theoretical, at a temperature of about 150° F.

In general, the structure of materials known as wax phenol metal sulfonate is visualized to be as follows:

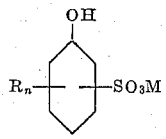

wherein R may be wax or other hydrocarbon radical of comparable chain length, M is the hydrocarbon equivalent of a metal, and $n$ is 1 to 3. The wax groups may be derived from a fraction of a viscous mineral oil ranging in molecular weight from that of a light wax distillate to a heavy residuum. The primary factor to be considered in determining the value of $n$ is the resulting solubility of the compound in water.

Materials known as wax phenol (1–14) sodium sulfonate are a good example of a surface active agent useful in the process of the present invention. With respect to the connotation (1–14), the first number indicates the theoretical degree of alkylation, i. e., the atomic proportions of chlorine in the chlorwax which is reacted with one mol of the hydroxy aromatic compound, and the second number indicates the weight per cent of chlorine in the chlorwax. The wax phenol (1–14) sodium sulfonate actually is a mixture of the mono-wax phenol sulfonate, the diwax phenol sulfonate, and of some poly-wax phenol sulfonates.

The test for determining whether a wetting agent will be operable or not in the process of the present invention is the "bubble machine" test [see Engineering and Mining Journal, 137, 291 (1936)] equipped with a cold stage. In this test, a piece of wax of the type to be removed and having at least one relatively flat surface is immersed in the oil-wax or oil-wax-solvent mixtures to be dewaxed containing 0.1 per cent by weight of the surface active agent to be tested. The system is then cooled to the dewaxing temperature. A droplet of non-freezing aqueous solution containing 0.1 per cent by weight of the surface active agent to be tested, is placed in a bubble holder and the droplet is then permitted to come into contact with the wax surface. If a finite three-phase (from wax through oil or oil-solvent to non-freezing aqueous solution) contact angle can be measured, the surface active agent being tested will be operable in the process of the present invention. The larger the three-phase contact angle, the more effectual the surface active agent will be in the process. Therefore, if the non-freezing aqueous solution spreads over the entire flat wax surface (contact angle=180°), the surface active agent being tested will be very effectual. Accordingly, the surface active agents operable herein can be defined as those which produce a finite three-phase contact angle in the "bubble machine" test at the dewaxing temperature.

Using the "bubble machine" test, a number of wetting agents were tested with the following results:

TABLE III

[Non-freezing aqueous solution=60% water–40% ethylene glycol.

| Wetting Agent | Three-Phase Contact Angle, Degrees | |
|---|---|---|
| | Paraffin Wax | Micro-crystalline Wax |
| Sodium Wax Phenol Sulfonate (1–14) | 17 | 17 |
| Tergitol 7 | 22 | <10 |
| Tergitol 4 | 22 | <10 |
| Span 60 | 50 | 50 |
| Nekal A | 43 | <10 |
| Nekal B | 47 | <10 |
| $C_{12}H_{25}C_6H_3(OH)SO_3Na$ | 36 | <10 |
| $C_9H_{19}C_6H_3(OH)SO_3Na$ | 24 | <10 |
| $(C_{18}H_{37})_3C_6H(OH)SO_3Na$ | 24 | <10 |
| $(C_{18}H_{37})_2P\begin{smallmatrix}\nearrow O \\ \searrow OH\end{smallmatrix}$ | 60 | <10 |
| $[CH_3CH(CH_2)_4]_2P\begin{smallmatrix}\nearrow O \\ \searrow OH\end{smallmatrix}$ with $C_2H_5$ | 30 | <10 |

The amounts of surface active agent to be used may vary between wide limits. Ordinarily, excessive amounts are to be avoided since it has been found that they effect emulsification of the oil or oil-solvent mixture in the non-freezing aqueous solution. On the other hand, the use of insufficient amounts will result in indifferent results. In general, the amounts of surface active agent to be used depend upon the amount of wax present in the stock undergoing treatment. Obviously, the optimum amounts to be utilized in any given instance can be readily determined by those skilled in the art by a few preliminary tests. In practicing the invention, it has been found that amounts varying between about 0.1 per cent and about 5 per cent, preferably, between about 0.25 per cent and about 2.5 per cent, based on the weight of the wax-containing oil or oil-containing wax in the charge will produce satisfactory results.

The surface active agent is ordinarily added to the charge as a solution in water. In conformance with the mechanism of operation postulated hereinbefore, the water is an essential factor in the successful operation of the process of the present invention. The wax surfaces will be at least partially covered, ultimately, with water or aqueous solution, collectively, aqueous phase. The amounts to be used depend, of course, upon the amount of wax present in the stock undergoing treatment. Obviously, the optimum amounts to be utilized in any given instance can be readily determined by those skilled in the art by a few preliminary tests. In practice, it has been found that amounts varying between about 2.5 per cent and about 100 per cent, preferably, between about 5 per cent and about 25 per cent, based on the weight of the wax-containing oil or oil-containing wax in the charge will produce satisfactory results.

Also in accordance with the modus operandi of the process of the present invention, it is likewise essential that the water remain in the liquid state at the dewaxing temperatures utilized. Accordingly, various substances are added to the water to lower its freezing point to a temperature below that at which dewaxing is effected. These substances, preferably, should be substantially completely soluble in and miscible with water, they should not manifest any substantial tendency to emulsify under the conditions of the process, they should be poor solvents for solid wax at the dewaxing temperatures, they must not disturb the adsorption of the molecules of the surface active agent to concentrate at the solid wax surfaces, and, finally, they must not affect, to any appreciable extent, the tendency of the surface active agent to concentrate at the solid wax surfaces. Ethylene glycol, sodium chloride, propylene glycol, diethylene glycol, triethylene glycol, and glycerine may be mentioned by way of non-limiting examples of substances adapted to produce non-freezing aqueous solutions utilizable in the process contemplated herein.

The amounts of these substances to be employed, obviously, will depend on the amount of water being utilized and on the type of material being used for such purposes. As will be appreciated by those skilled in the art, the amounts to be used in any particular case can be readily determined by a few preliminary tests once the dewaxing temperature to be applied has been established, the criteria applicable being, as stated hereinbefore, to maintain the water solution in the liquid state at dewaxing temperatures. Agitation is necessary to effect dispersion of the non-freezing aqueous solution in the wax-bearing oil and to ensure collision between the dispersed aqueous solution droplets and wax particles during and after chilling.

In order to facilitate the dispersion of the non-freezing aqueous solution in the wax-oil or wax-oil solvent mixture and to ensure that the wax-oil or wax-oil-solvent mixture constitutes a homogeneous liquid phase at the beginning of the treatment, it is ordinarily preferred to heat the mixture to temperatures varying between about 100° F. and about 200° F. during the dispersion operation. The temperature to be utilized to produce optimum results will depend upon the nature of the stock undergoing treatment.

The dewaxing or pressing temperatures applicable in the process are those of the prior art, i. e., between about −20° F. and about 60° F. It must be recognized, of course, that the dewaxing temperature applicable in any particular instance will depend upon the nature of the system, i. e., the surface active agent utilized, the type of aqueous solution, the type of dewaxing solvent, etc.

The rate at which the temperature of the mixture is lowered to dewaxing or pressing temperature (the chilling rate) is not a critical factor, although, as it will be appreciated by those skilled in the art, an important factor. The chilling rate, as is well known, is determinative of the size of the wax crystals that precipitate out during the chilling operation. For general purposes it has been found that an average chilling rate of about 30° F. per hour to about 100° F. per hour is conducive to optimum results.

Although the foregoing discussion has indicated a preferred sequence of the addition of the various components to the system and of the manipulations involved in the process, it must be clearly understood that departures from them may be made. For example, the wax-oil mixture, the oil solvent and the non-freezing aqueous solution of surface active agent, may be separately chilled and then mixed at any temperature down to the dewaxing or pressing temperature.

The following examples are for the purpose of illustrating modes of carrying out the process of the present invention and to point out the advantages thereof, it being understood that the invention is not to be considered as being limited to the specific stocks, surface active agents, oil solvents and aqueous solutions or to the manipulations, apparatuses, and conditions set forth therein. As it will be apparent to those skilled in the art, a wide variety of stocks, surface active agents, oil solvents and aqueous solutions and a diversity of apparatuses, manipulations and conditions, as described hereinbefore, may be employed to carry out the wax filter pressing operation.

*Example 1*

CONVENTIONAL WAX FILTER PRESSING

Six liters of a Mid-Continent type waxy distillate having a Saybolt Universal viscosity of 36.4 seconds at 210° F. were chilled from a temperature of 100° F. to the pressing temperature, 18° F., at a rate of about 75° F. per hour. The chilled stock was then charged to a filter press at a pressure of 250 pounds per square inch. Pressing was terminated after twelve hours. The following results were obtained:

Pressed oil in cc_____ 1890
Average throughput, cc./hr_____ 157
Pour point of pressed oil, °F_____ 15
Oil-content of wax cake, per cent_____ 40.0

*Example 2*

EFFECT OF NON-FREEZING AQUEOUS SOLUTION

The run set forth in Example 1 was repeated with the exception that 10 c. c. per hundred grams of oil of a 75 per cent–25 per cent by volume water-ethylene glycol solution were added to the charge. The mixture was heated to a temperature of 110° F. and stirred with a power mixer until the temperature dropped to 100° F. The chilling rate was approximately 90° F. per hour. The following results were obtained:

Pressed oil in c. c_____ 1850
Average throughput, c. c./hr_____ 154
Pour point of pressed oil, °F_____ 10
Oil-content of wax cake, per cent_____ 46.6

*Example 3*

EFFECT OF NON-FREEZING AQUEOUS SOLUTION OF SURFACE ACTIVE AGENT

The run set forth in Example 2 was repeated with the exception that 0.5 gram per hundred grams of oil of "Tergitol 7" were added to the charge. The chilling rate was approximately 80° F. per hour. The following results were obtained:

Pressed oil in c. c_____ 2040
Average throughput, c. c./hr_____ 170
Pour point of pressed oil, °F_____ 15
Oil-content of wax cake, per cent_____ 33.8

*Example 4*

EFFECT OF WASHING THE WAX CAKE WITH NON-FREEZING AQUEOUS SOLUTION OF SURFACE ACTIVE AGENT

To six liters of a Mid-Continent waxy distillate having a Saybolt Universal viscosity of 36.4 seconds at 210° F. were added 5 c. c. per hundred grams of oil of a 75 per cent–25 per cent by volume water-ethylene glycol solution containing 0.25 gram per hundred grams of oil of "Tergitol 7." The mixture was heated to a temperature of 110° F. and then stirred with a power mixer until the temperature dropped to 100° F. The charge was then chilled to a temperature of 18° F. at a rate of about 53° F. per hour. The chilled charge was then passed into a filter press at a pressure of 250 pounds per square inch. Pressing was terminated after twelve hours. The wax cake was then washed for six hours with a 75 per cent–25 per cent by volume water-ethylene glycol solution containing 5 per cent by weight of "Tergitol 7." The following results were obtained.

Pressed oil in c. c_____ 2400
Pressed oil from wash operation in c. c___ 180
Average throughput, c. c./hr_____ 143
Pour point of pressed oil, °F_____ 15
Oil-content of washed wax cake, per cent__ 18.2

*Example 5*

EFFECT OF SURFACE ACTIVE AGENT ON WASHING OPERATION

The run described in Example 4 was repeated except that the use of a non-freezing aqueous solution of surface active agent was omitted during the pressing cycle and that in the washing cycle, no surface active agent was employed. The chilling rate was 63° F. per hour. The following results were obtained:

Pressed oil in c. c_____ 1930
Pressed oil from wash operation in c. c___ 300
Average throughput, c. c./hr_____ 124
Pour point of pressed oil, °F_____ 15
Oil-content of washed wax cake, per cent__ 18.5

*Examples 6 and 7*

EFFECT OF AMOUNT OF AQUEOUS PHASE

The run set forth in Example 4 was repeated in each instance but with varying amounts of non-freezing aqueous solution of surface active agent. For convenience, the pertinent data and results of these examples as well as those of Example 4 are set forth in Table IV.

TABLE IV

| Example No | 6 | 4 | 7 |
|---|---|---|---|
| "Tergitol 7," grams/100 grams of oil | 0.5 | 0.25 | 0.125 |
| Water Glycol, cc./100 grams of oil | 10 | 5 | 2.5 |
| "Tergitol 7," grams/100 cc. wash | 1.0 | 5.0 | 5.0 |
| Chilling Rate, ° F./hr | 52 | 53 | 60 |
| Pressed Oil Volume, cc | 1,990 | 2,400 | 2,110 |
| Pressed Oil Volume from Wash Operation, cc | 180 | 180 | 180 |
| Average Throughout, cc./hr | 121 | 143 | 127 |
| Pressed Oil Pour Point, ° F | 10 | 15 | 15 |
| Wash Oil Pour Point, ° F | 15 | 10 | 15 |
| Wax Cake Oil-Content, Percent | 17.5 | 18.2 | 16.9 |

*Examples 8 and 9*

EFFECT OF CONCENTRATION OF SURFACE ACTIVE AGENT

The run set forth in Example 4 was repeated in each instance but the concentration of surface active agent in a constant quantity of aqueous phase was varied. For convenience, the pertinent data and results of these examples, as well as those of Example 4, are set forth in Table V.

TABLE V

| Example No. | 4 | 8 | 9 |
|---|---|---|---|
| "Tergitol 7," grams/100 grams of oil | 0.25 | 0.10 | 0.375 |
| Water Glycol, cc./100 grams of oil | 5 | 5 | 5 |
| "Tergitol 7," grams/100 cc. wash | 5 | 2 | 7.5 |
| Chilling Rate, °F./hr | 53 | 38 | 80 |
| Pressed Oil Volume, cc | 2,400 | 1,860 | 2,120 |
| Pressed Oil Volume from Wash Operation, cc | 180 | 170 | 180 |
| Average Throughput, cc./hr | 143 | 127 | 128 |
| Pressed Oil Pour Point, °F | 15 | 15 | 20 |
| Wash Oil Pour Point, °F | 10 | 15 | 15 |
| Wax Cake Oil Content, Percent | 18.2 | 26.9 | 20.1 |

Examples 10 and 11

EFFECT OF CHILLING RATE

The run set forth in Example 4 was repeated in each instance but the chilling rate was varied. For convenience, the pertinent data and results of these examples, as well as those of Example 4, are set forth in Table VI.

TABLE VI

| Example No. | 10 | 4 | 11 |
|---|---|---|---|
| "Tergitol 7," grams/100 grams of oil | 0.25 | 0.25 | 0.25 |
| Water Glycol, cc./100 grams of oil | 5 | 5 | 5 |
| "Tergitol 7," grams/100 cc. wash | 5 | 5 | 5 |
| Chilling Rate, °F./hr | 24 | 53 | 120 |
| Pressed Oil Volume, cc | 2,345 | 2,400 | 1,895 |
| Pressed Oil Volume from Wash Operation, cc | 75 | 180 | 120 |
| Average Throughput, cc./hr | 134 | 143 | 126 |
| Pressed Oil Pour Point, °F | 15 | 15 | 15 |
| Wash Oil Pour Point, °F | 15 | 10 | 15 |
| Wax Cake Oil Content, Percent | 12.6 | 18.2 | 17.1 |

In view of the foregoing, it will be appreciated by those skilled in the art that surface active agents operable in the process contemplated herein may be present in, or may be introduced into, the system through the wax-oil mixture, through the solvent, or, possibly, through the substances utilized for maintaining the water in substantially the liquid state at the dewaxing temperature. These contingencies can be readily established through a "bubble machine" test carried out in the absence of an added surface active agent. Accordingly, it must be clearly understood that when in the specification and in the claims hereof, the presence of a surface active agent is referred to, either the introduction of a surface active agent into the system through these contingencies or the actual addition of a surface active agent to the system, or both, is intended.

It will be apparent from the foregoing that the present invention provides an improved and simple process for effecting wax filter pressing. It will be appreciated by those skilled in the art that the present invention may be embodied in other specific forms without departing from the spirit or essential attributes thereof. Accordingly, it must be clearly understood that the present embodiments be considered in all respects illustrative and not restrictive, reference being had to the appended claims rather than to the foregoing description to indicate the scope of the invention.

What is claimed is:

1. A wax filter pressing process which comprises adding an aqueous solution, which is capable of remaining in substantially the liquid state at the pressing temperature, to a wax-oil mixture in an amount varying between about 2.5% and about 100%, based on the weight of the wax-oil mixture, to produce an aqueous solution-wax-oil mixture; treating said aqueous solution-wax-oil mixture, in the presence of a surface active agent that produces a finite three-phase contact angle in the bubble machine test at the pressing temperature, in amounts of at least about 0.1%, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase, and to associate wax with said dispersed phase, thereby producing a dispersed wax-aqueous solution phase, said dispersion being maintained at the de-waxing temperature, whereby wax is present in the solid state; and subjecting said dispersion to a wax filter pressing operation.

2. A wax filter pressing process which comprises adding an aqueous solution, which is capable of remaining in substantially the liquid state at the pressing temperature, to a wax-oil mixture, in an amount varying between about 2.5% and about 100%, based on the weight of the wax-oil mixture, to produce an aqueous solution-wax-oil mixture, treating said aqueous solution-wax-oil mixture, in the presence of a surface active agent that produces a finite three-phase contact angle in the bubble machine test at the pressing temperature, in amount of at least about 0.1%, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase; cooling said dispersion to the pressing temperature to precipitate wax; continuing said treating to associate wax with said dispersed phase and to produce a dispersed wax-aqueous solution phase; and subjecting said dispersion to a wax filter pressing operation.

3. A wax filter pressing process which comprises cooling a wax-oil mixture to the pressing temperature to precipitate wax; cooling an aqueous solution which is capable of remaining in substantially the liquid state at the pressing temperature, to the pressing temperature; adding said aqueous solution to said wax-oil mixture, at the pressing temperature, in an amount varying between about 2.5% and about 100%, based on the weight of the wax-oil mixture, to produce an aqueous solution-wax-oil mixture; treating said aqueous solution-wax-oil mixture at the pressing temperature, in the presence of a surface active agent that produces a finite three-phase contact angle in the bubble machine test at the pressing temperature, in amounts of at least about 0.1%, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase, and to associate wax with said dispersed phase, thereby producing a dispersed wax-aqueous solution phase; and subjecting said dispersion to a wax filter pressing operation.

4. A process for reducing the oil-content of an oil-containing wax cake, which comprises washing said cake with an aqueous solution which is capable of remaining in substantially the liquid state at the pressing temperature, at the pressing temperature, in the presence of a surface active agent that produces a finite three-phase contact angle in the bubble machine test at the pressing temperature.

5. A wax filter pressing process which comprises adding a solvent to a wax-oil mixture to produce a solvent-wax-oil mixture; adding an aqueous solution, which is capable of remaining in substantially the liquid state at the pressing temperature, to said solvent-wax-oil mixture, in an amount varying between about 2.5% and about 100%, based on the weight of the wax-oil mixture, to produce an aqueous solution-solvent-wax-oil mixture; agitating said aqueous solution-solvent-wax-oil mixture, in the presence of an alkali metal salt of a sulfated fatty acid that produces a finite three-phase contact angle in the bubble machine test at the pressing temperature, in amounts of at least about 0.1%, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase; cooling said dispersion to the pressing temperature to precipitate wax; continuing said agitating to associate wax with said dispersed phase and to produce a dispersed wax-aqueous solution phase; and subjecting said dispersion to a wax filter pressing operation.

6. A wax filter pressing process which comprises adding a solvent to a wax-oil mixture to produce a solvent-wax-oil mixture; adding an aqueous solution, which is capable of remaining in substantially the liquid state at the pressing temperature, to said solvent-wax-oil mixture, in an amount varying between about 5% and about 25%, based on the weight of the wax-oil mixture, to produce an aqueous solution-solvent-wax-oil mixture; agitating said aqueous solution-solvent-wax-oil mixture, in the presence of $C_{17}H_{34}SO_4Na$, in amounts varying between about 0.25% and about 2.5%, based on the weight of the wax-oil mixture, to produce a dispersion in which the aqueous solution is the dispersed phase and the solvent-wax-oil mixture is the continuous phase; cooling said dispersion to the pressing temperature to precipitate wax; continuing said agitating to associate wax with said dispersed phase and to produce a dispersed wax-aqueous solution phase; and subjecting said dispersion to a wax filter pressing operation.

7. A wax filter pressing process which comprises adding a solvent to a wax-oil mixture to produce a solvent-wax-oil mixture; cooling said solvent-wax-oil mixture to the pressing temperature to precipitate wax; cooling an aqueous solution which is capable of remaining in substantially the liquid state at the pressing temperature to the pressing temperature; adding said aqueous solution to said solvent-wax-oil mixture, at the pressing temperature, in an amount varying between about 2.5% and about 100%, based on the weight of the wax-oil mixture, to produce an aqueous solution-solvent-wax-oil mixture; agitating said aqueous solution-solvent-wax-oil mixture at the pressing temperature, in the presence of an alkali metal salt of a sulfated fatty acid that produces a finite three-phase contact angle in the bubble machine test at the pressing temperature, in amounts of at least about 0.1%, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase, and to associate wax with said dispersed phase, thereby producing a dispersed wax-aqueous solution phase; and subjecting said dispersion to a wax filter pressing operation.

8. A wax filter pressing process which comprises adding a solvent to a wax-oil mixture to produce a solvent-wax-oil mixture; cooling said solvent-wax-oil mixture to the pressing temperature to precipitate wax; cooling an aqueous solution which is capable of remaining in substantially the liquid state at the pressing temperature to the pressing temperature; adding said aqueous solution to said solvent-wax-oil mixture, at the pressing temperature, in an amount varying between about 5% and about 25%, based on the weight of the wax-oil mixture, to produce an aqueous solution-solvent-wax-oil mixture; agitating said aqueous solution-solvent-wax-oil mixture at the pressing temperature, in the presence of $C_{17}H_{34}SO_4Na$, in amounts varying between about 0.25% and about 2.5%, based on the weight of the wax-oil mixture, to produce a dispersion in which the aqueous solution is the dispersed phase and the solvent-wax-oil mixture is the continuous phase, and to associate wax with said dispersed phase, thereby producing a dispersed wax-aqueous solution phase; and subjecting said dispersion to a wax filter pressing operation.

9. A process for reducing the oil content of an oil-containing wax cake, which comprises washing said cake with an aqueous solution which is capable of remaining in substantially the liquid state at the pressing temperature, at the pressing temperature, in the presence of an alkali metal salt of a sulfated fatty acid that produces a finite three-phase contact angle in the bubble machine test at the pressing temperature.

10. A process for reducing the oil content of an oil-containing wax cake, which comprises washing said cake with an aqueous solution which is capable of remaining in substantially the liquid state at the pressing temperature, at the pressing temperature, in the presence of $C_{17}H_{34}SO_4Na$.

11. A wax filter pressing process which comprises adding a solvent to a wax-oil mixture to produce a solvent-wax-oil mixture; adding an aqueous solution, which is capable of remaining in substantially the liquid state at the pressing temperature, to said solvent-wax-oil mixture, in an amount varying between about 2.5% and about 100%, based on the weight of the wax-oil mixture, to produce an aqueous solution-solvent-wax-oil mixture; agitating said aqueous solution-solvent-wax-oil mixture, in the presence of an alkali metal salt of an alkyl-substituted aryl sulfonic acid that produces a finite three-phase contact angle in the bubble machine test at the pressing temperature, in amounts of at least about 0.1%, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase, and to associate wax with said dispersed phase, thereby producing a dispersed wax-aqueous solution phase; and subjecting said dispersion to a wax filter pressing operation.

12. A wax filter pressing process which comprises adding a solvent to a wax-oil mixture to produce a solvent-wax-oil mixture; adding an aqueous solution, which is capable of remaining in substantially the liquid state at the pressing temperature, to said solvent-wax-oil mixture, in an amount varying between about 5% and about 25%, based on the weight of the wax-oil mixture, to produce an aqueous solution-solvent-wax-oil mixture; agitating said aqueous solution-solvent-wax-oil mixture, in the presence of a sodium salt of a wax-substituted aryl sulfonic acid that produces a finite three-phase contact angle in the bubble machine test at the pressing temperature, in amounts varying between about 0.25% and about 2.5%, based on the weight of the wax-oil mixture, to produce a dispersion in which the aqueous solution is the dispersed phase and the solvent-wax-oil mixture is the continuous phase, and to associate wax with said dispersed phase, thereby producing a dispersed wax-aqueous solution phase; and subjecting said dispersion to a wax filter pressing operation.

13. A wax filter pressing process which comprises adding a solvent to a wax-oil mixture to produce a solvent-wax-oil mixture; adding an aqueous solution, which is capable of remaining in substantially the liquid state at the pressing temperature, to said solvent-wax-oil mixture, in an amount varying between about 5% and about 25%, based on the weight of the wax-oil mixture to produce an aqueous solution-solvent-wax-oil mixture; agitating said aqueous solution-solvent-wax-oil mixture, in the presence of sorbitan monostearate in amounts varying between about 0.25% and about 2.5%, based on the weight of the wax-oil mixture, to produce a dispersion in which the aqueous solution is the dispersed phase and the solvent-wax-oil mixture is the continuous phase; cooling said dispersion to the pressing temperature to precipitate wax; continuing said agitating to associate wax with said dispersed phase and to produce a dispersed wax-aqueous solution phase; and subjecting said dispersion to a wax filter pressing operation.

14. A wax filter pressing process which comprises adding a solvent to a wax-oil mixture to produce a solvent-wax-oil mixture; cooling said solvent-wax-oil mixture to the pressing temperature to precipitate wax; cooling an aqueous solution which is capable of remaining in substantially the liquid state at the pressing temperature to the pressing temperature; adding said aqueous solution to said solvent-wax-oil mixture, at the pressing temperature, in an amount varying between about 5% and about 25%, based on the weight of the wax-oil mixture, to produce an aqueous solution-solvent-wax-oil mixture; agitating said aqueous solution-solvent-wax-oil mixture at the pressing temperature, in the presence of sorbitan monostearate in amounts varying between about 0.25% and about 2.5%, based on the weight of the wax-oil mixture, to produce a dispersion in which the aqueous solution is the dispersed phase and the solvent-wax-oil mixture is the continuous phase, and to associate wax with said dispersed phase, thereby producing a dispersed wax-aqueous solution phase; and subjecting said dispersion to a wax filter pressing operation.

15. A process for reducing the oil content of an oil-containing wax cake, which comprises washing said cake with an aqueous solution which is capable of remaining in substantially the liquid state at the pressing temperature, at the pressing temperature, in the presence of an alkali metal salt of an alkyl-substituted aryl sulfonic acid that produces a finite three-phase contact angle in the bubble machine test at the pressing temperature.

16. A process for reducing the oil content of an oil-containing wax cake, which comprises washing said cake with an aqueous solution which is capable of remaining in substantially the liquid state at the pressing temperature, at the pressing temperature, in the presence of a sodium salt of a wax-substituted aryl sulfonic acid that produces a finite three-phase contact angle in the bubble machine test at the pressing temperature.

17. A process for reducing the oil content of an oil-containing wax cake, which comprises washing said cake with an aqueous solution which is capable of remaining in substantially the liquid state at the pressing temperature, at the pressing temperature, in the presence of sorbitan monostearate.

HAROLD C. MYERS.
ARNOLD O. PUKKILA.
JAMES I. BARNES.

References Cited in the file of this patent

UNITED STATES PATENTS

| Number | Name | Date |
|---|---|---|
| 2,022,990 | Peski | Dec. 3, 1935 |
| 2,100,915 | Pevere | Nov. 30, 1937 |
| 2,153,895 | McKittrick et al. | Apr. 11, 1939 |
| 2,161,581 | Knowles | June 6, 1939 |
| 2,164,013 | Jenkins | June 27, 1939 |
| 2,168,306 | Schutte | Aug. 1, 1939 |
| 2,263,535 | Carr et al. | Nov. 18, 1941 |
| 2,267,093 | Hall et al. | Dec. 23, 1941 |